(12) United States Patent
Tezuka et al.

(10) Patent No.: US 9,152,142 B2
(45) Date of Patent: Oct. 6, 2015

(54) SERVO CONTROLLER FOR CORRECTING POSITION ERROR WHEN MOVING MEMBER REVERSES

(71) Applicant: FANUC CORPORATION, Minamitsuru-gun, Yamanashi (JP)

(72) Inventors: Junichi Tezuka, Yamanashi (JP); Hajime Ogawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 84 days.

(21) Appl. No.: 14/100,937

(22) Filed: Dec. 9, 2013

(65) Prior Publication Data

US 2014/0167672 A1   Jun. 19, 2014

(30) Foreign Application Priority Data

Dec. 14, 2012   (JP) .................................. 2012-273237

(51) Int. Cl.
*G05B 19/10*   (2006.01)
*G05B 19/404*   (2006.01)

(52) U.S. Cl.
CPC .................................... *G05B 19/404* (2013.01)

(58) Field of Classification Search
CPC .. G05B 19/19; H02P 23/0005; Y10T 408/165
See application file for complete search history.

(56) References Cited

U.S. PATENT DOCUMENTS

| 7,659,682 B2 * | 2/2010 | Matsumoto et al. ........... 318/625 |
| 2008/0054834 A1 | 3/2008 | Nakamura |

FOREIGN PATENT DOCUMENTS

| CN | 101977009 A | 2/2011 |
| CN | 102195545 A | 9/2011 |
| CN | 102455683 A | 5/2012 |
| JP | 1124754 A | 1/1999 |
| JP | 2001-95274 A | 4/2001 |
| JP | 2003157114 A | 5/2003 |
| JP | 2004234205 A | 8/2004 |
| JP | 3621278 B | 2/2005 |
| JP | 2008-210273 A | 9/2008 |
| JP | 2009154274 A | 7/2009 |
| JP | 201049599 A | 3/2010 |

OTHER PUBLICATIONS

Office Action issued Feb. 12, 2015, corresponding to Chinese patent application No. 201310685081.9.

(Continued)

*Primary Examiner* — Karen Masih
(74) *Attorney, Agent, or Firm* — Hauptman Ham, LLP

(57) ABSTRACT

A servo controller (10) includes a reversal change calculating part (24) which uses the position of a moving member (19) as the basis to calculate the amount of change of the position of the moving member, a distance calculating part (25) which uses a position of the moving member as the basis to calculate a distance from the servo motor to the moving member, an approximation equation determining part (26) which uses the amount of change of the position of the moving member, distance, and the torque command as the basis to calculate a position correction amount which corrects delay of the servo motor due to reversal of the servo motor, and a position correction calculating part (27) which uses the approximation equation as the basis to calculate the position correction amount.

4 Claims, 4 Drawing Sheets

(56) References Cited

OTHER PUBLICATIONS

Office Action mailed Jul. 1, 2014, corresponds to Japanese patent application No. 2012-273237.

Office Action dated May 20, 2015, corresponding to Chinese patent application No. 201310685081.9.

* cited by examiner

SERVO CONTROLLER FOR CORRECTING POSITION ERROR WHEN MOVING MEMBER REVERSES

RELATED APPLICATIONS

The present application claims priority to Japanese Application Number 2012-273237, filed Dec. 14, 2012, the disclosure of which is hereby incorporated by reference herein in its entirety.

BACKGROUND OF THE INVENTION

1. Technical Field

The present invention relates to a servo controller which corrects position error when a moving member reverses.

2. Description of the Related Art

A servo controller is used for making a moving member accurately operate based on a position command. Such a machine is a machine tool which makes a moving member move along a feed shaft. In this regard, when the feed shaft is a threaded shaft of a ball screw, when the direction of movement of the moving member reverses, backlash or friction causes the reversal operation to be delayed. As a result, position error occurs.

In general, to correct delay at the time of reversal, the practice has been to add a position correction amount which corresponds to the backlash to the position command and to add a speed correction amount which compensates for the delay due to friction to the speed command.

However, when the feed shaft is a threaded shaft of a ball screw, the threaded shaft extends and contracts in the axial direction. Due to this, delay is caused at the time of reversal. To eliminate this, Japanese Patent No. 3621278 discloses a configuration provided with a mechanical end correction constant multiplying part which multiplies the torque which the electric motor generates by a constant factor and an adder which adds the total torque command value which is multiplied by the constant factor to the position command. In this case, it is possible to change the position command while considering the amount of extension or contraction of the threaded shaft due to the torque and as a result accurately correct the delay at the time of reversal.

However, the amount of extension or contraction of a threaded shaft changes not only due to the torque of the electric motor, but also the position of the moving member at the threaded shaft. In Japanese Patent No. 3621278, the position of the moving member is not considered, so there are limits to control of the position of the moving member with a high precision.

Further, to calculate the position correction amount with a high precision, it is necessary to prepare an optimal approximation equation based on the relationship between the amount of deformation of the threaded shaft, which includes the amount of extension or contraction, the torque of the electric motor, and the position of the moving member. However, if utilizing all of this data, calculation of the approximation equation becomes complicated and tremendous effort is required for the servo controller.

The present invention was made in consideration of this situation and has as its object the provision of a servo controller which can correct the position error by a high precision and in a simple manner when the moving member reverses.

SUMMARY OF INVENTION

To achieve the above-mentioned object, according to a first aspect, there is provided a servo controller which drives a threaded shaft of a ball screw which is connected to a servo motor so as to make a moving member which is engaged with the threaded shaft move, the servo controller comprising a motor position acquiring part which acquires a position of the servo motor every predetermined control period, a moving member position acquiring part which acquires a position of the moving member every predetermined control period, a torque command preparing unit which prepares a torque command of the servo motor every predetermined control period, a reversal change calculating part which uses the position of the moving member which was acquired by the moving member position acquiring part as the basis to calculate the amount of change of the position of the moving member, a distance calculating part which uses the position of the servo motor which was acquired by the motor position acquiring part or the position of the moving member which was acquired by the moving member position acquiring part as the basis to calculate a distance from the servo motor to the moving member, an approximation equation determining part which uses the amount of change of the position of the moving member which was calculated by the reversal change calculating part, the torque command which was prepared by the torque command preparing unit, and the distance which was calculated by the distance calculating part as the basis to determine an approximation equation for calculating a position correction amount which corrects delay of the servo motor due to reversal of the servo motor, and a position correction calculating part which uses the approximation equation which was determined by the approximation equation determining part as the basis to calculate the position correction amount.

According to a second aspect, there is provided the first aspect wherein the approximation equation determining part determines a linear approximation equation for calculating the position correction amount based on the amount of change of the position of the moving member at least at two different locations on the threaded shaft where the servo motor reverses, the torque command, and the distance.

According to a third aspect, there is provided the first or second aspect wherein the torque command preparing unit prepares a load torque which is obtained by subtracting a torque which is required for acceleration or deceleration of the servo motor from the torque command, and the approximation equation determining part determines an approximation equation for calculating the position correction amount based on the amount of change of the position of the moving member, the load torque, and the distance.

These and other objects, features, and advantages of the present invention will become clearer from the detailed description of typical embodiments of the present invention which are shown in the attached drawings.

DETAILED DESCRIPTION

Below, embodiments of the present invention will be explained with reference to the attached drawings. In the following figures, similar members are assigned similar reference notations. To facilitate understanding, these figures are suitably changed in scale.

Figure 1:
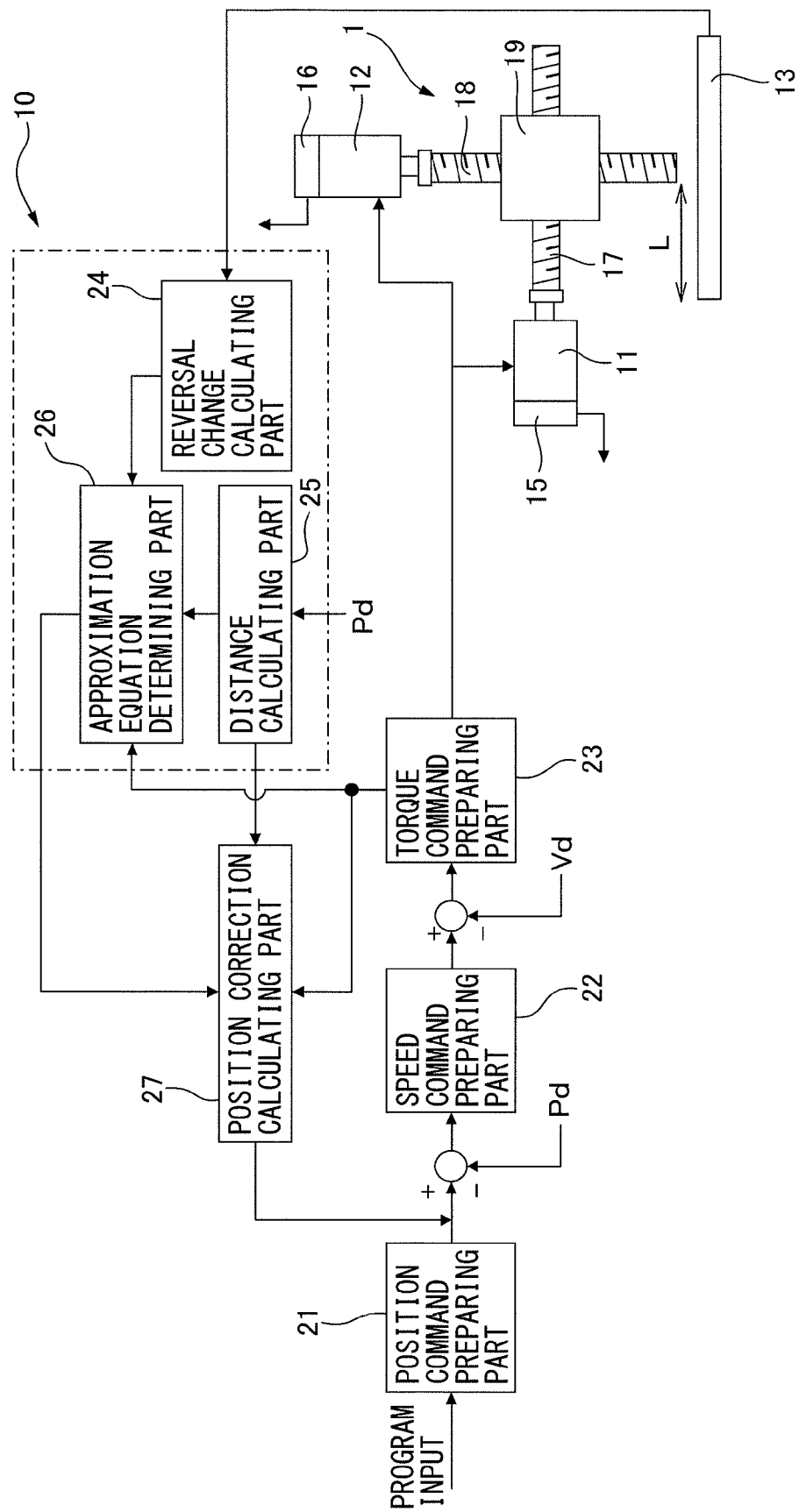
FIG. 1 is a functional block diagram of a servo controller in the present invention.

FIG. 1 is a functional block diagram of a servo controller in the present invention. As shown in FIG. 1, a machine tool 1 includes a first servo motor 11 with an output shaft to which a first threaded shaft 17 is attached and a second servo motor 12 with an output shaft to which a second threaded shaft 18 is attached. As can be seen from FIG. 1, these first threaded shaft 17 and second threaded shaft 18 perpendicularly intersect and function as the X-axis and Y-axis.

In FIG. 1, a common moving member 19 is engaged with the first threaded shaft 17 and the second threaded shaft 18. The moving member 19 performs the function of a nut of a ball screw which is attached to the threaded shaft of a ball screw comprised of a first threaded shaft 17 and a second threaded shaft 18.

As illustrated, the first servo motor 11 and second servo motor 12 are connected to the servo controller 10 and are controlled by the servo controller 10. Further, while not shown in the drawings, the moving member 19 holds a workpiece, and a not shown machining tool is arranged to face the workpiece W. Alternatively, the machining tool may be fastened to the moving member 19 and the workpiece W may be held on a separate work table.

Further, the first servo motor 11 and the second servo motor 12 are provided with encoders 15, 16. These encoders 15, 16 detect the positions of the servo motors 11, 12 every predetermined control period. Based on the position data which is detected every predetermined control period, the position detection value Pd of the output shaft and the speed detection value Vd are found. Therefore, these encoders 15, 16 perform the function of a motor position acquiring part which acquires the positions of the servo motors 11, 12 every predetermined control period.

Further, as shown in FIG. 1, a linear scale 13 is arranged in parallel to the first threaded shaft 17. This linear scale 13 measures the position of the moving member in a direction parallel to the first threaded shaft 17 every predetermined control period. Therefore, the linear scale 13 performs the function of a moving member position acquiring part. Note that, a similarly configured additional linear scale may be arranged in parallel to the second threaded shaft 18.

The servo controller 10 includes a position command preparing unit 21 which reads a program and prepares position commands Pc of the first and second servo motors 11, 12 every predetermined control period. Further, the servo controller 10 includes a speed command preparing unit 22 which uses the deviation which is obtained by subtracting the position detection values Pd which are prepared by the encoders 15, 16 from the position commands Pc as the basis to prepare speed commands Vc of the first and second servo motors 11, 12. Furthermore, the servo controller 10 includes a torque command preparing unit 23 which uses the deviation which is obtained by subtracting the speed detection values Vd which are prepared by the encoders 15, 16 from the speed commands Vc as the basis to prepare torque commands Tc of the first and second servo motors 11, 12.

Further, the servo controller 10 includes a reversal change calculating part 24 which uses the position of the moving member 19 which was acquired by the linear scale 13 as the basis to calculate the amount of change of the position of the moving member 19 when the servo motor 11 reverses and a distance calculating part 25 which uses the position of the first servo motor 11 which was acquired by the motor position acquiring part 15 and the position of the moving member 19 which was acquired by the linear scale 13 as the basis to calculate the distance L from the first servo motor 11 to the moving member 19.

Furthermore, the servo controller 10 includes an approximation equation determining part 26 which uses an amount of change of the position of the moving member 19 which is calculated by the reversal change calculating part 24, a torque command Tc which is prepared by the torque command preparing unit 23, and a distance L which is calculated by the distance calculating part 25 as the basis to determine an approximation equation for calculating a position correction amount which corrects delay of the first servo motor 11 due to reversal of the first servo motor 11 and a position correction calculating part 27 which uses an approximation equation which is determined by the approximation equation determining part 26 as the basis to calculate the position correction amount.

Figure 2:
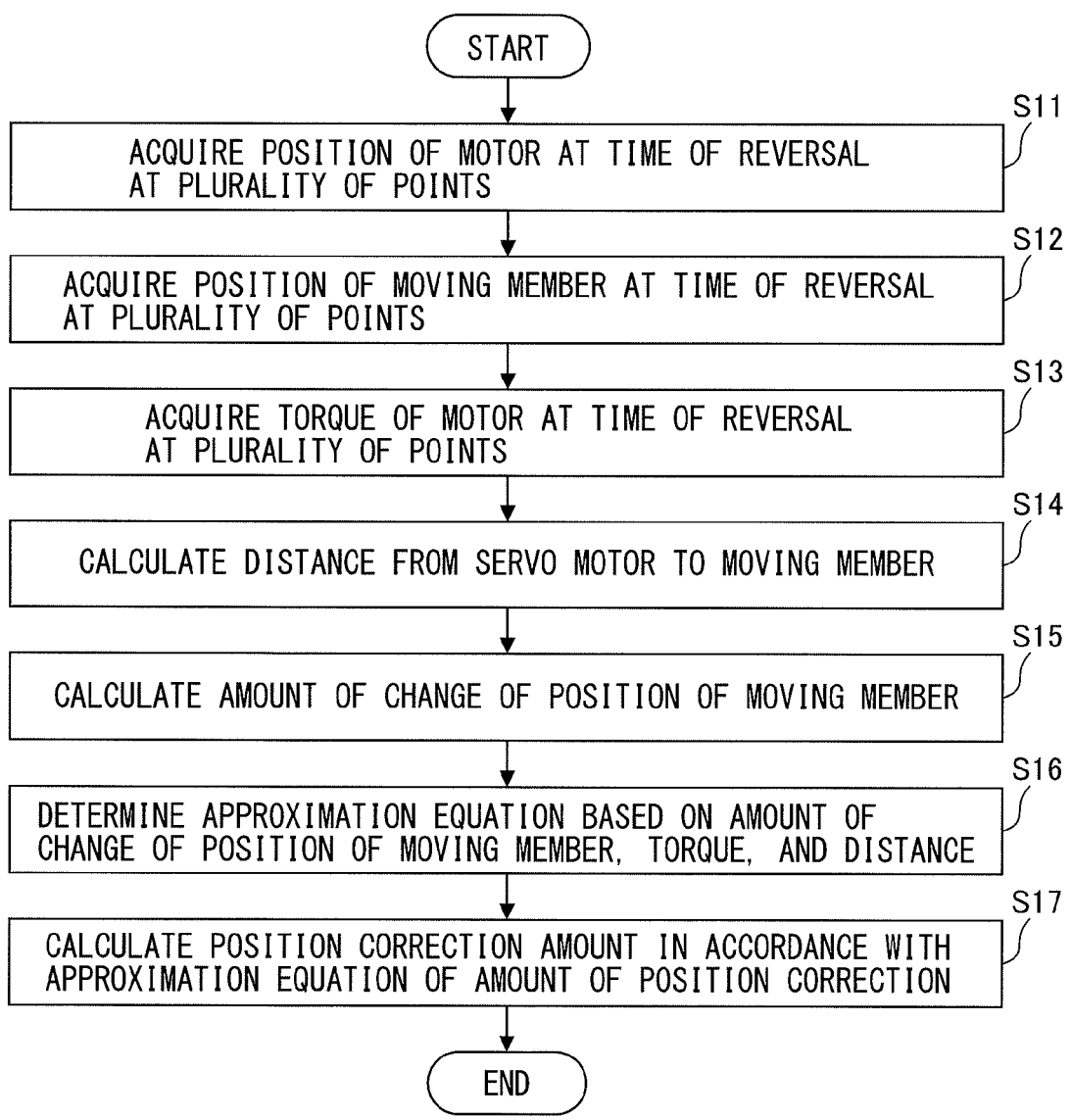
FIG. 2 is a flow chart which show the operation of the servo controller which is shown in FIG. 1.

FIG. 2 is a flow chart which shows the operation of the servo controller which is shown in FIG. 1. In the following explanation, the control of the first servo motor 11 was mainly explained, but the second servo motor 12 is also similarly controlled.

First, the operating program which machines the workpiece W is read from a storage part (not shown) of the servo controller 10. This operating program drives the first servo motor 11 and second servo motor 12 so as to make the moving member 19 move along a predetermined arc shaped path. Alternatively, the operating program may drive only the first servo motor 11 to make the moving member 19 move back and forth on the first threaded shaft 17. Below, the operating program is assumed to be one which relates to an arc shaped path.

First, at step S11 of FIG. 2, the moving member 19 is made to move to a plurality of different positions on the first threaded shaft 17 at the arc shaped path. Further, at these plurality of positions, the first servo motor 11 is made to reverse. The position of the first servo motor 11 at this time is acquired by the encoder 15 every predetermined control period.

Figure 3:
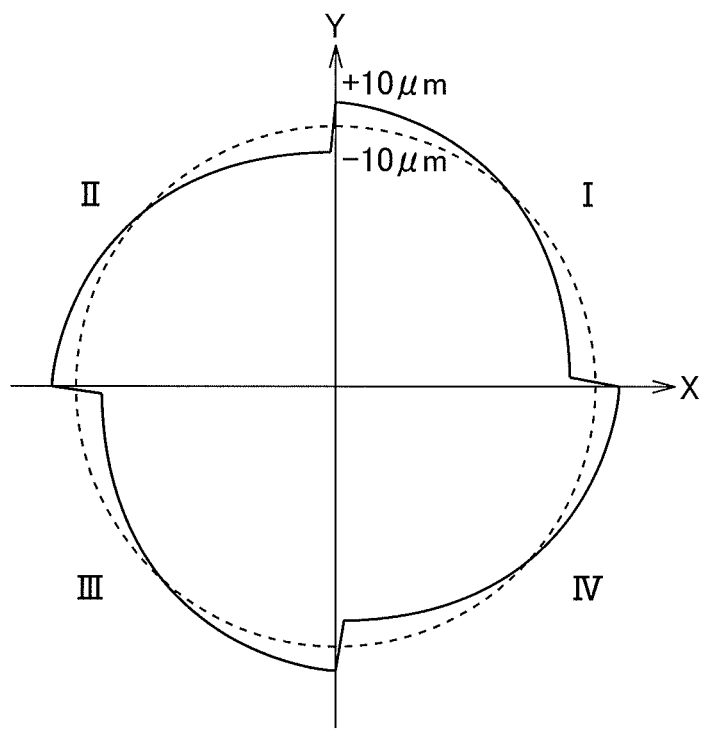
FIG. 3 is a view which shows an actual path and a corrected path of a moving member when machining a workpiece along an arc shaped path.

These plurality of positions are preferably locations which are accompanied with reversal operations of the first servo motor 11 on the arc shaped path. In this connection, FIG. 3 is a view which shows an actual path (solid line) and a corrected path (broken line) of a moving member in the case of machining a workpiece along an arc shaped path. The plurality of different positions are preferably, in FIG. 3, locations of transition from the second quadrant II to the third quadrant III and locations of transition from the fourth quadrant IV to the first quadrant I. These locations of transition correspond to the vicinity of one end and the vicinity of the other end of the first threaded shaft 17 (for example, the point C and the point D in FIG. 6).

Note that, the linear scale 13 may be arranged along the second threaded shaft 18. In such a case, the plurality of positions are locations which are accompanied with reversal operations of the second servo motor 12 on an arc shaped path. Such a plurality of positions are, in FIG. 3, locations of transition from the first quadrant I to the second quadrant II and locations of transition from the third quadrant III to the fourth quadrant IV.

Referring again to FIG. 2, at step S12, at the same time as the operation of step S11, the linear scale 13 is used to also obtain the position of the moving member 19, when the first servo motor 11 is made to reverse at the above-mentioned plurality of positions, every predetermined control period. Furthermore, at step S13, at the same time as the operation of step S12, the torque command preparing unit 23 acquires the torque command Tc, when the first servo motor 11 is made to reverse at the above-mentioned plurality of positions, every predetermined control period.

Then, at step S14, the distance calculating part 25 uses the position of the first servo motor 11 which is acquired at step S11 or the position of the moving member 19 which is acquired at step S12 as the basis to calculate the distance L from the output end of the first servo motor 11 to the moving member 19. To calculate the distance L, the value which is detected at the control period when the later explained "quadrant glitch" occurs is employed.

Furthermore, at step S15, the reversal change calculating part 24 uses the position of the moving member 19 which was acquired at step S12 as the basis to calculate the amount of change $\epsilon$ of the position of the moving member 19 when the first servo motor 11 reverses. The operations at step S14 and step S15 are assumed to be performed at the above-mentioned plurality of positions.

Figure 4:
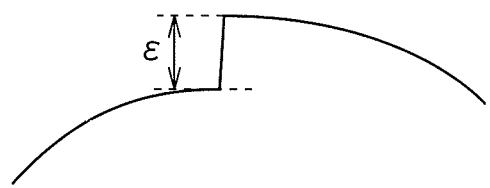
FIG. 4 is a partial enlarged view of the actual path of the moving member which is shown in FIG. 3.

FIG. 4 is partial enlarged view of the actual path of the position of the moving member which is shown in FIG. 3. As shown in FIG. 4, the actual position of the movement member which is measured by the linear scale 13 greatly changes before and after reversal of the servo motor and a quadrant glitch occur. At step S15, the magnitude of the quadrant glitch is calculated as the amount of change $\epsilon$ of the position of the moving member 19.

Then, at FIG. 2, step S16, the torque command Tc which was acquired at step S13, the distance L which was calculated at step S14, and the amount of change $\epsilon$ of the position of the moving member 19 which was calculated at step S15 are used as the basis for the approximation equation determining part 26 to determine the approximation equation. This approximation equation is used for calculation of the position correction amount which corrects delay of the first servo motor 11 due to reversal of the first servo motor 11. Further, at step S17, the position correction calculating part 27 calculates the position correction amount $\epsilon$ in accordance with the approximation equation.

In this connection, the approximation equation which the approximation equation determining part 26 determines will be explained.

When driving the first servo motor 11 which is connected to the first threaded shaft 17 of the ball screw so as to drive the moving member 19 on the first threaded shaft 17, the position of the moving member 19 is influenced by the rigidity of the first threaded shaft 17. For example, when the coupling part of the first servo motor 11 and the first threaded shaft 17 is low in rigidity, torsion which is proportional to the torque occurs. Further, when the first threaded shaft 17 itself is small in rigidity, the force which the moving member 19 applies to the first threaded shaft 17 causes the first threaded shaft 17 to extend or contract in the axial direction.

When the Young's modulus of the first threaded shaft 17 is E [N/m$^2$], the cross-sectional area of the first threaded shaft 17 is S [m$^2$], and the distance from the end of the first threaded shaft 17 which is coupled with the first servo motor 11 to the moving member 19 is L [m], the spring constant k [N/m] is expressed by equation (1):

$$k = E \cdot S / L \quad (1)$$

Further, by Hooke's Law, the amount of extension or contraction $\epsilon 1$ of the first threaded shaft 17 of the ball screw, the torque T, and a coefficient "a" relating to the ball screw satisfy the following equation (2):

$$T = a \cdot k \cdot \epsilon 1 \quad (2)$$

Therefore, the amount of extension or contraction $\epsilon 1$ of the first threaded shaft 17 of the ball screw is expressed by the following equation (3):

$$\epsilon 1 = T/(a \cdot k) = T/(a \cdot E \cdot S/L) = A \cdot T \cdot L \quad (3)$$

Note that, the letter "A" is another coefficient relating to the ball screw.

Further, the amount of positioning error $\epsilon 2$ due to the torsion of the coupling part is proportional to the rotational torque of the first servo motor 11, so the following equation (4) stands:

$$\epsilon 2 = B \cdot T \quad (4)$$

In equation (4), the letter "B" is a coefficient relating to the coupling part which couples the first servo motor 11 and the first threaded shaft 17.

As can be seen from equation (3) and equation (4), the approximation equation of the position correction amount $\epsilon$ (corresponding to the above-mentioned amount of deformation) is a function of the torque T and the distance L as variables. The amount of change $\epsilon$ of the position of the moving member 19 which is calculated at step S15 includes not only the error which is due to backlash and friction, but also the extension and contraction of the first threaded shaft 17 and torsion of the coupling part.

Figure 5:
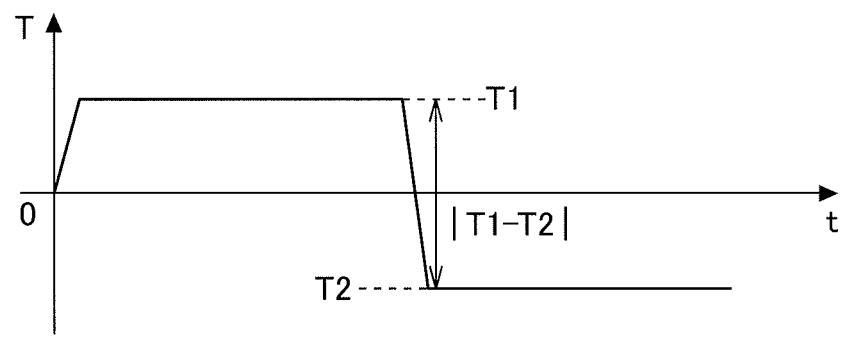
FIG. 5 is a view which shows the relationship between time and torque.

In this connection, FIG. 5 is a view which shows the relationship between the time and torque. The abscissa indicates the time, while the ordinate indicates torque. In FIG. 5, the change in the torque T when the moving member 19 is positioned at a certain location on the first threaded shaft 17 (distance L) is shown. As shown in FIG. 5, the torque T descends from T1 to T2 due to reversal of the first servo motor 11.

The amount of change $\epsilon$ of the position of the moving member 19 corresponds to the absolute value |T1−T2| of the torque difference which is shown in FIG. 5. Therefore, the amount of change of the position of the moving member 19 per unit torque is indicated by $\epsilon/|T1-T2|$.

As explained above, the distance L is calculated at step S14 at a plurality of positions, for example, at the point C and the point D. The plurality of positions may be three or more. By increasing the measurement locations, it is possible to raise the precision of the approximation equation. Further, for similar reasons, the plurality of positions are preferably in proximity to each other.

Figure 6:
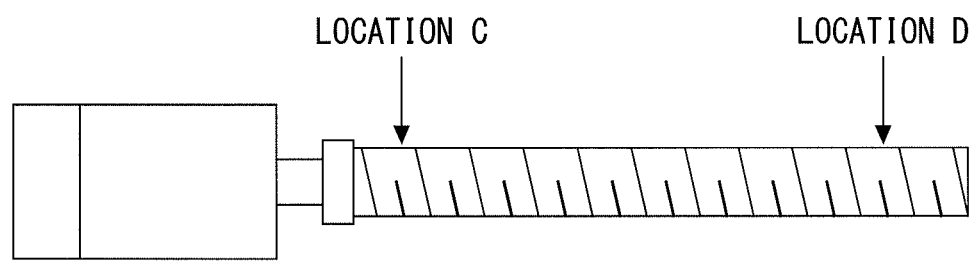
FIG. 6 is an enlarged view of a servo motor and threaded shaft.

At step S16, the approximation equation determining part 26 determines the approximation equation in the following way. First, the distance L1 at the point C and the distance L2 at the point D as shown in FIG. 6 are acquired and the amounts of change $\epsilon$ at the distances L1, L2 are acquired. Further, the amounts of change per unit torque $\epsilon/|T1-T2|$ at the distances L1, L2 are calculated.

Figure 7:
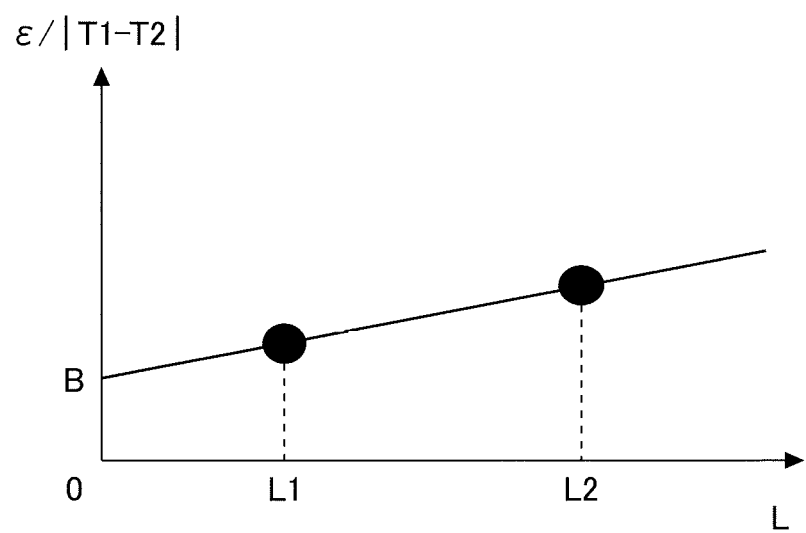
FIG. 7 is a view which shows the relationship of the distance from the servo motor to the moving member and the amount of change per unit torque.

Then, these amounts of change $\epsilon/|T1-T2|$ per unit torque are plotted with respect to the distance L. FIG. 7 is a view which shows the relationship between the distance from the servo motor to the moving member and the amount of change per unit torque. In FIG. 7, the abscissa indicates the distance L, while the ordinate indicates the amount of change ϵ/|T1−T2| per unit torque.

The amount of change ϵ of the position of the moving member 19 is the sum of the amount of extension and contraction ϵ1 of the first threaded shaft 17 and the amount of positioning error ϵ2 due to the torsion of the coupling part. From equation (3) and equation (4), the following approximation equation (5) and equation (6) stand.

$$\epsilon = \epsilon 1 + \epsilon 2 = A \cdot T \cdot L + B \cdot T = (A \cdot L + B)T \quad (5)$$

$$\epsilon/T = A \cdot L + B \quad (6)$$

As can be seen from FIG. 7, the coefficient A in equation (6) is the slant of the line which is shown in FIG. 7, while the coefficient B is the value of the point where the line and ordinate intersect. Since the coefficients A, B are found in this way, equation (5) is determined. By using equation (5), the amount of change ϵ of the position of the moving member 19 can be easily calculated.

Note that, when measuring the distance L etc. for three or more positions at the first threaded shaft 17, the least square method is used to determine equation (5). Due to this, it will be understood that a further higher precision approximation equation can be obtained.

By adding the position correction amount ϵ, which includes the amount of extension and contraction ϵ1 of the first threaded shaft 17 and the amount of positioning error ϵ2 of the coupling part, to the position command Pc, the position of the moving member 19 can be controlled by a high precision. Further, as shown in FIG. 1, the amount of change ϵ which is calculated in accordance with the approximation equation (5) is added at the adder 28 to the position command Pc. Further, the new position command Pc to which the amount of change ϵ has been added is used as the basis to prepare the speed command Vc and torque command Tc. Due to this, the first servo motor 11 is controlled.

FIG. 3 shows the path after correction based on a new position command. As can be seen from FIG. 3, no quadrant glitch occurs in the corrected path. Therefore, in the present invention, it will be understood that a smooth reversal operation is performed and the moving member 19 can be made to smoothly move along an arc-shaped path.

In this way, in the present invention, an approximation equation in which the distances L1, L2 from the servo motor to the moving member are considered is used as the basis to calculate the position correction amount ϵ. This position correction amount ϵ is a correction value in which not only the conventional effects of backlash and friction, but also the amount of extension and contraction of the threaded shaft 17 of the ball screw and the amount of positioning error of the coupling part are considered. For this reason, in the present invention, it becomes possible to correct the position error when the moving member reverses by a high precision and in a simple manner in accordance with the actual configuration of the machine in which the ball screw is provided.

Further, the torque command preparing unit 23 can subtract the torque which is required for acceleration or deceleration of the first servo motor 11 from the torque command Tc to prepare a load torque. Such a torque which is required for acceleration or deceleration can be found from the acceleration which is obtained by differentiation of the inertia and motor speed. Further, the load torque may be used to calculate the position correction amount ϵ from equation (5) etc. In general, the change in the position of the moving member 19 at the time of reversal is greatly affected by the load torque. Therefore, when using the load torque, the position correction amount ϵ can be calculated by a higher precision.

Referring to FIG. 1 etc., the case when making the moving member 19 move along an arc shaped path was explained. However, the present invention is also applied to a single-axis type machine tool with no second servo motor 12 and second threaded shaft 18 when making the moving member 19 move back and forth along the threaded shaft 17. In other words, the error which occurs in the position of the moving member when the first servo motor 11 is used to make the moving member reverse in operation can be eliminated by the above-mentioned position correction amount ϵ. As a result, it is learned that the moving member 19 can be made to move back and forth smoothly. A servo controller for such a single axis type of machine tool is also included in the scope of the present invention.

Advantageous Effects of Invention

In the first aspect, an approximation equation in which the distance from the servo motor to the moving member is considered is used as the basis to calculate the position correction amount. Therefore, the amount of extension and contraction of the threaded shaft of a ball screw and the amount of positioning error of the coupling part may also be considered for correction. For this reason, it is possible to correct position error when the moving member reverses by a high precision and in a simple manner in accordance with the actual configuration of the machine in which a ball screw is provided.

In the second aspect, at least two different locations are utilized to calculate the linear approximation equation, so the position correction amount can be calculated more simply.

In the third aspect, a load torque in which the torque which is required for acceleration or deceleration of the servo motor is subtracted is used, so the position correction amount can be more accurately calculated.

Typical embodiments were used to explain the present invention, but a person skilled in the art would understand that the above-mentioned changes and various other changes, deletions, and additions may be made without departing from the scope of the present invention.

The invention claimed is:

1. A servo controller which drives a threaded shaft of a ball screw which is connected to a servo motor so as to make a moving member which is engaged with said threaded shaft move, said servo controller comprising:

a motor position acquiring part which acquires a position of said servo motor every predetermined control period, a moving member position acquiring part which acquires a position of said moving member said every predetermined control period, a torque command preparing unit which prepares a torque command of said servo motor said every predetermined control period, a reversal change calculating part which uses a position of said moving member which was acquired by said moving member position acquiring part as the basis to calculate the amount of change of the position of said moving member when the servo motor reverses, a distance calculating part which uses the position of said servo motor which was acquired by said motor position acquiring part or the position of said moving member which was acquired by said moving member position acquiring part as the basis to calculate a distance from an output end of said servo motor to said moving member, an approximation equation determining part which uses the amount of change of the position of said moving member which was calculated by said reversal change calculating part, the torque command which was prepared by said torque command preparing unit, and the distance which was calculated by said distance calculating part as the basis to determine an approximation equation for calculating a position correction amount which corrects delay of said servo motor due to reversal of said servo motor, and a position correction calculating part which uses the approximation equation which was determined by said approximation equation determining part as the basis to calculate said position correction amount.

2. The servo controller as set forth in claim 1, wherein said approximation equation determining part determines a linear approximation equation for calculating said position correction amount based on the amount of change of the position of said moving member at least at two different locations on said threaded shaft where said servo motor reverses, said torque command, and said distance.

3. The servo controller as set forth in claim 1, wherein said torque command preparing unit prepares a load torque which is obtained by subtracting a torque which is required for acceleration or deceleration of said servo motor from said torque command, and said approximation equation determining part determines an approximation equation for calculating said position correction amount based on the amount of change of the position of said moving member, said load torque, and said distance.

4. The servo controller as set forth in claim 2, wherein said torque command preparing unit prepares a load torque which is obtained by subtracting a torque which is required for acceleration or deceleration of said servo motor from said torque command, and said approximation equation determining part determines an approximation equation for calculating said position correction amount based on the amount of change of the position of said moving member, said load torque, and said distance.

* * * * *